O. S. McCURDY.
BRAKE SHOE ADJUSTER.
APPLICATION FILED JAN. 17, 1908.
935,804.
Patented Oct. 5, 1909.
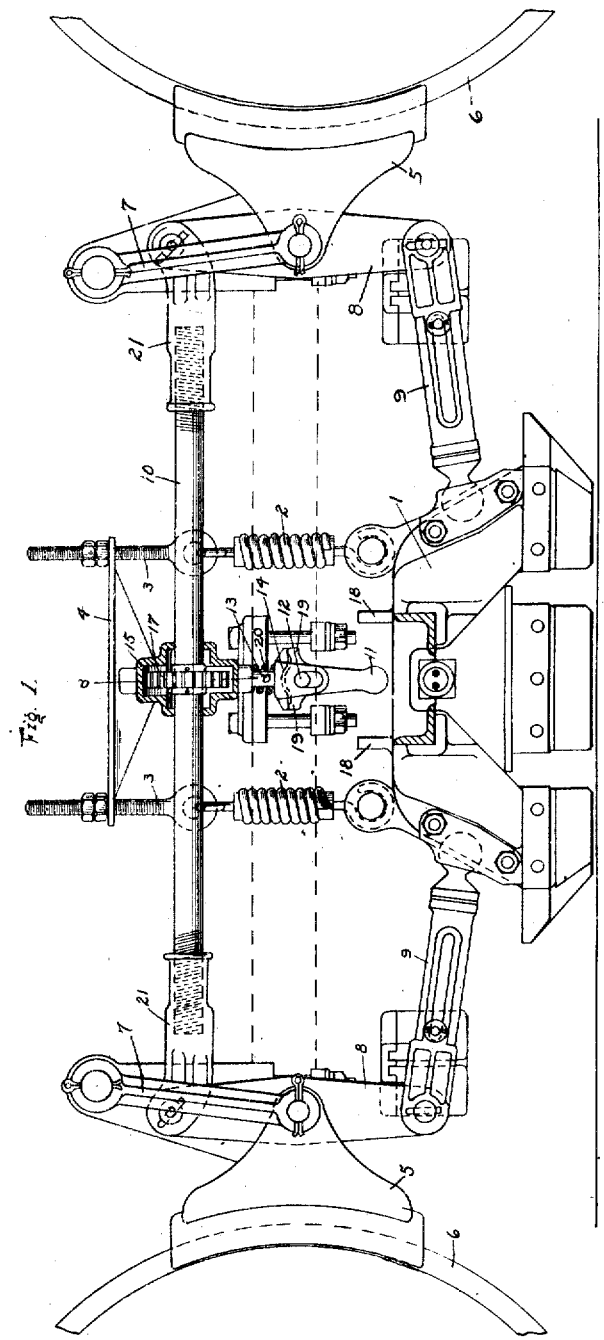
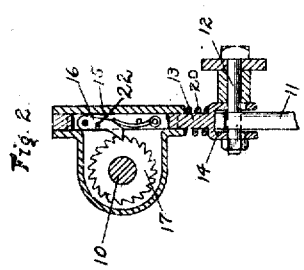
WITNESSES
Wm. M. Cady
J. S. Custer
INVENTOR
Oscar S. McCurdy
by E. Wright
Att'y.

UNITED STATES PATENT OFFICE.

OSCAR S. McCURDY, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE-SHOE ADJUSTER.

935,804.

Specification of Letters Patent.

Patented Oct. 5, 1909.

Application filed January 17, 1908. Serial No. 411,225.

*To all whom it may concern:*

Be it known that I, OSCAR S. McCURDY, a citizen of the United States, residing at Wilkinsburg, in the county of Allegheny and State of Pennsylvania, have invented new and useful Improvements in Brake-Shoe Adjusters, of which the following is a specification.

My invention relates to devices adapted to automatically compensate for the wear of the brake shoe and maintain the normal release distance between shoe and wheel or other engaging surface substantially constant.

My invention has special reference to a brake of that type wherein the dragging action of a brake shoe on the rail is employed to apply brake shoes to the wheels, and the principal object of my invention is to provide a brake shoe adjusting device in a brake of the above character which is operated by the dragging action of the rail brake shoe for maintaining the distance between the wheel brake shoes and the wheels substantially constant in normal release position.

In the accompanying drawing; Figure 1 is an elevational view of a car brake of the above character, with a preferred construction of my invention applied thereto; and Fig. 2 a sectional view of a portion of the adjusting mechanism taken on the line *a—a* of Fig. 1.

According to the construction illustrated in Fig. 1 of the drawing, the car brake may comprise a rail brake shoe 1, which is suspended above the rail on springs 2, supported in position by adjustable bolts 3, which are mounted in a bracket 4 secured to the car truck frame. Wheel brake shoes 5 are suspended in position adjacent the wheels 6, by pivotally mounted hangers 7. Brake levers 8, operatively connected with the brake shoes 5, are pivotally connected at one end to push bars 9, which are connected to the rail brake 1, and the opposite ends of the levers 8 are connected together by a rod 10.

As thus far described, the construction is substantially the same as that covered in Reissue Patent No. 11,786, dated November 7, 1899. The rail brake in this patent being provided with an electrical coil winding, so that upon sending a current of electricity therethrough, the rail shoe acts as a magnet and is attracted to the rail, causing the dragging movement thereof, which acts through the push rods and levers to apply the wheel brakes.

For adjusting the clearance between brake shoe and wheel I preferably provide a downwardly projecting rocker arm 11, which may be pivotally mounted on a bolt 12, secured to the car frame, and an adjusting bar 13, having a yoke 14 on one end fitting over the rocker arm 11 and slotted for the bolt 12 to permit the vertical movement of the bar 13. The other end of the bar extends upwardly into a guideway in a ratchet casing 15 and is slotted to contain a spring pressed pawl 16. The casing 15 contains a ratchet wheel 17, which is mounted on the rod 10, said casing being provided with apertures on opposite sides for the rod 10. The pawl 15 is adapted to engage the teeth of the ratchet wheel 17, so that the downward movement of the adjusting bar 13 tends to turn the ratchet wheel 17, and the upward movement of the bar to cause the pawl to ride over the ratchet teeth.

On the top of the rail brake shoe 1, and in line with the rocker arm 11, are secured lugs 18, which are so positioned that when the dragging movement of the brake shoe 1, necessary to bring the wheel shoe 5 to the wheel, has increased a certain predetermined amount, by reason of the wear of the wheel shoe, one of the lugs 18 will strike the depending end of the rocker arm 11 and cause one of the fingers 19 thereon to elevate the adjusting rod 13, so that the pawl 16 is lifted into a higher tooth on the ratchet wheel 17, and then upon the usual release of the brakes, the rocker arm 11 assumes its normal vertical position, and the adjusting bar with the pawl moves downwardly, turning the ratchet wheel the amount of one tooth. If desired, a spring 20 may be interposed between the casing 15 and the yoke 14 to facilitate the downward movement of the adjusting rod 13. The turning of ratchet wheel 17 may be utilized in different ways for adjusting the brake shoes toward the wheels, but preferably I provide right and left hand threads on the opposite ends of the equalizing bar 10 respectively, for screw threaded engagement with nut members 21, pivotally secured to the levers 8. It will now be apparent that by turning the ratchet wheel 17 and bar 10, the nut portions 21 may be shifted outwardly, thereby setting the brake shoes relatively nearer to the wheels.

Thus I have constructed a simple device whereby the wheel shoes may be maintained at a substantially constant distance from the wheels in normal release position.

In order to hold the pawl 16 away from the ratchet wheel 17, in case the adjusting rod 13 is moved up for the purpose of adjusting the rod 10 by hand, I may provide a pin 22, secured to the rod 13 and adapted to engage in a slot in the pawl 16, so that the outward movement of the pawl 16 will be limited.

Having now described my invention, what I claim as new and desire to secure by Letters Patent is:—

1. The combination with a plurality of brake shoes, of means operated by one brake shoe for adjusting another one of said brake shoes.

2. The combination with a plurality of brake shoes, of means operated by one brake shoe for adjusting the other brake shoes.

3. The combination with a plurality of brake shoes, of means operated by the dragging movement of one brake shoe, for adjusting the other brake shoes.

4. In a car brake, the combination with a rail brake shoe and wheel brake shoes applied by the dragging movement of the rail brake shoe, and means operated by said dragging movement for adjusting the wheel brake shoes.

5. In a car brake, the combination with a rail brake shoe and wheel brake shoes applied by the dragging movement of the rail brake shoe, and means operated by said dragging movement for adjusting the wheel brake shoes to compensate for wear.

6. The combination with a plurality of brake shoes, of means operated by the dragging movement of one brake shoe for adjusting the other brake shoes to compensate for their wear.

7. In a car brake, the combination with a brake shoe and wheel brake shoes applied by the dragging movement of said brake shoe, of an adjustable screw operated by said dragging movement to compensate for the wear of said wheel brake shoes.

8. In a car brake, the combination with a brake shoe and wheel brake shoes applied by the dragging movement of said brake shoe, of an adjusting device adapted to compensate for the wear of the wheel brake shoes and a rocker arm operated by the dragging movement of said brake shoe, for actuating said adjusting device.

9. The combination with a brake shoe, of a brake shoe adjusting mechanism operated by the dragging action of said shoe.

10. The combination with a brake shoe, of a brake shoe adjusting mechanism adapted to compensate for the wear of a brake shoe and operated by the dragging action of said brake shoe.

In testimony whereof I have hereunto set my hand.

OSCAR S. McCURDY.

Witnesses:
R. F. EMERY,
WM. M. CADY.